United States Patent
Hodge

(10) Patent No.: US 6,590,723 B1
(45) Date of Patent: Jul. 8, 2003

(54) OPTICAL INSTRUMENT MOUNT

(75) Inventor: Robert B. Hodge, Grants Pass, OR (US)

(73) Assignee: SD Instruments, Grants Pass, OR (US)

( * ) Notice: Subject to any disclaimer, the term of this patent is extended or adjusted under 35 U.S.C. 154(b) by 56 days.

(21) Appl. No.: 10/005,517

(22) Filed: Nov. 8, 2001

(51) Int. Cl.⁷ .............................................. G02B 7/02
(52) U.S. Cl. ........................................ 359/822; 403/52
(58) Field of Search ................... 359/811, 694, 359/822, 819; 267/175, 177, 166; 403/52, 54, 56

(56) References Cited

U.S. PATENT DOCUMENTS

| | | | |
|---|---|---|---|
| 317,157 A | 5/1885 | Lowrie | 403/220 |
| 923,045 A | 5/1909 | Gulick | 280/124.165 |
| 1,029,052 A | 6/1912 | Engle et al. | 280/778 |
| 1,190,502 A | 7/1916 | Anderson | 403/146 |
| 1,485,036 A | 2/1924 | Kingsley | 464/57 |
| 2,134,197 A | 10/1938 | Miller | 131/225 |
| 2,170,201 A | 8/1939 | Knapp | 248/122.1 |
| 2,469,425 A | 5/1949 | Andersen | 248/188.3 |
| 2,478,041 A | 8/1949 | Chason | 74/582 |
| 2,749,161 A | 6/1956 | Latzen | 403/138 |
| 2,807,119 A | 9/1957 | Beebe | 446/317 |
| 3,266,059 A | 8/1966 | Stelle | 623/62 |
| 3,456,514 A | 7/1969 | Gebendinger | 74/110 |
| 4,199,179 A * | 4/1980 | Curry | 292/338 |
| 4,311,941 A | 1/1982 | Hiraoka et al. | 313/336 |
| 4,700,017 A | 10/1987 | Morand | 174/86 |
| 4,832,452 A * | 5/1989 | Eisler | 359/813 |
| 5,564,664 A | 10/1996 | Oschwald | 248/288.51 |
| 5,737,132 A * | 4/1998 | Luecke et al. | 359/819 |
| 6,129,476 A | 10/2000 | Berman et al. | 403/229 |
| 6,352,227 B1 * | 3/2002 | Hathaway | 248/160 |

* cited by examiner

Primary Examiner—Jordan M. Schwartz
Assistant Examiner—Jessica Stultz
(74) Attorney, Agent, or Firm—O'Melveny & Myers LLP

(57) ABSTRACT

An adjustable mounting structure comprising a first mounting plate, a second mounting plate adjustably fixed to a first mounting plate and in facing engagement with the first mounting plate, a pivot ball having a hole formed therethrough, the first and second mounting plates pivotable about the pivot ball, and a spring fixed to the first mounting plate at a first end and fixed to the second mounting plate at a second end, the spring passing through the hole formed through the pivot ball.

19 Claims, 2 Drawing Sheets

OPTICAL INSTRUMENT MOUNT

FIELD OF THE INVENTION

The present invention relates an improved design for an adjustable mount. The adjustable mount is particularly well suited for use with mounting fixtures to an optical table.

BACKGROUND OF THE INVENTION

The practice of advanced optical techniques requires the utilization of highly stable, rigid, and vibrationally damped structures in order to eliminate movement of the various components of an optical system relative to each other. These criteria are particularly important for laser-optical systems wherein even minor errors in the positioning of components can be devastating to the results obtained. One particular field where such high precision placement of the system components is required is the field of optical holography, where lasers are used to create precise three-dimensional images or holograms. Other fields include laser particle sensing technologies. To this end optical tables are used for supporting optical and other analytical devices, for example lasers; beamsplitters; directional, parabolic and other optical mirrors; and various optical lenses. All these components must be mounted on extremely rigid flat surfaces and bending or twisting of the surface of the optical table must be minimized in order to prevent displacement of the components relative to one another.

Optical tables are generally provided with a plurality of precisely formed and positioned holes to facilitate the mounting of the system components. And in order to benefit from the stability and rigidity of the optical table, the optical mounts utilized to affix the system components to a particular hole or holes on the optical table must be similarly rigid and stable. It is also highly desirable for the mounts to be adjustable to allow adjustment of the position and/or orientation of the optical components. To this end, many types of optical mounts have been designed which provide convenience in adjusting the position and/or orientation of various types of individual optical components or of entire optical systems. U.S. Pat. Nos. 6,016,230; 5,506,424; 6,198,580; and 4,712,444—the disclosures of which are incorporated by reference in their entirety—all show various optical mounts known in the art. A wide variety of general-purpose optical mounts for lenses, mirrors, lasers, fiber optics, and the like are also commercially available. FIG. 1 shows one such mount presently available for utilization with optical tables.

However, such mounts as is shown in FIG. 1 have been less than ideal for "real world" applications. Particularly, these mounts have a tendency to move out of alignment when shipped such that a precise arrangement of optical components is ruined when shipped and the recipient of the system must undertake to realign the components of the system. Particularly in an optical system, which may utilize many optical mounts, this requires a significant expenditure of time and money by the user. Systems incorporating optical components, including, for example, PCB drilling applications and laser eye surgical systems, are specific applications where durability and transportability are significant problems that must be addressed. Thus, it would be highly desirable to have a highly stable, rugged adjustable optical mount that can be positively locked after adjustment such that inadvertent movement of the mount is prevented.

SUMMARY OF THE INVENTION

The present invention comprises an improved mounting structure for mounting precision components to a stable structure. In a preferred embodiment, the stable structure comprises an optical table and the precision components comprise optical system components. The elements of an improved mounting structure of the present invention comprise a first mounting plate and a second mounting plate adjustably fixed to a first mounting plate and in facing engagement with the first mounting plate. The mounting structure further comprises a pivot ball having a hole formed therethrough, the first and second mounting plates pivotable about the pivot ball, and a spring fixed to the first mounting plate at a first end and fixed to the second mounting plate at a second end, the spring passing through the hole formed through the pivot ball.

In alternate embodiments, the first mounting plate is adjustably fixed to the second mounting plate at a first location, or at a first and second location, or at a first location and merely fixed at a second location. Also, in a preferred embodiment, the pivot ball is positioned within a recess formed by cooperating first and second detents provided in the first and second mounting plates.

A preferred method of the invention comprises the steps of: providing a mount comprising a first mounting plate, a second mounting plate, a pivot ball having a hole formed therethrough, and a spring; positioning the pivot ball between the first mounting plate and the second mounting plate; affixing the spring to the first mounting plate at a first end; and affixing the spring to the second mounting plate at a second end such that the spring passing through the hole formed through the pivot ball.

DETAILED DESCRIPTION OF THE PREFERRED EMBODIMENTS

Figure 1:
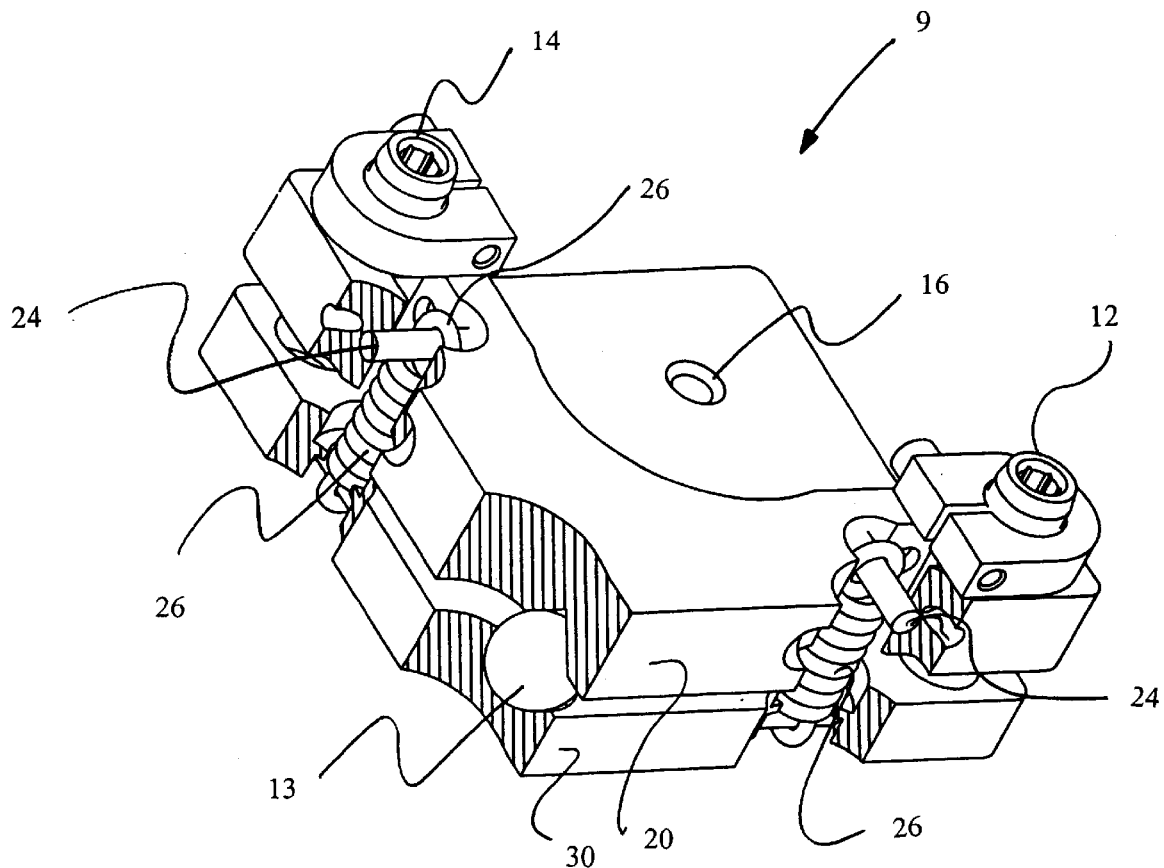
FIG. 1 shows a prior art mounting structure.

The present invention will now be described with reference to the attached figures. Turning to FIG. 1, a prior art mounting structure 9 is shown having a first mounting plate 20 and a second mounting plate 30. The first and second mounting plates 20, 30 include first and second detents 32, 34, respectively, which cooperate to form a recess. Disposed within the recess is a pivot ball 15 about which the first and second mounting plates 20, 30 rotate or "rock" during adjustment of the plates.

The first and second plates 20, 30 are shown in partial cut-away to better illustrate the manner in which the first and second plates 20, 30 are affixed together with springs 26 at opposing corners. The prior art mount shown in FIG. 1 typically includes first and second adjustment mechanisms 12, 14 by which the orientation of the first mounting plate 20 can be adjusted both in a forward and back and side-to-side tilt about the pivot ball 13. For example, adjustment of mechanism 12 causes the mounting plate 20 to hinge about an axis defined by the pivot ball 13 and the adjustment mechanism 14. Conversely, adjustment of mechanism 14 causes the mounting plate 20 to hinge about an axis defined by the pivot ball 13 and the adjustment mechanism 12. In this manner, the plane of the mounting plate 20 can be adjusted three-dimensionally with the respect to the mounting plate 30.

The mounting structure 9 also includes a mounting hole 16 suitable for accommodating the stem of a scientific instrument or other device that is desired to be mounted to an underlying structure such as an optical table.

Figure 2:
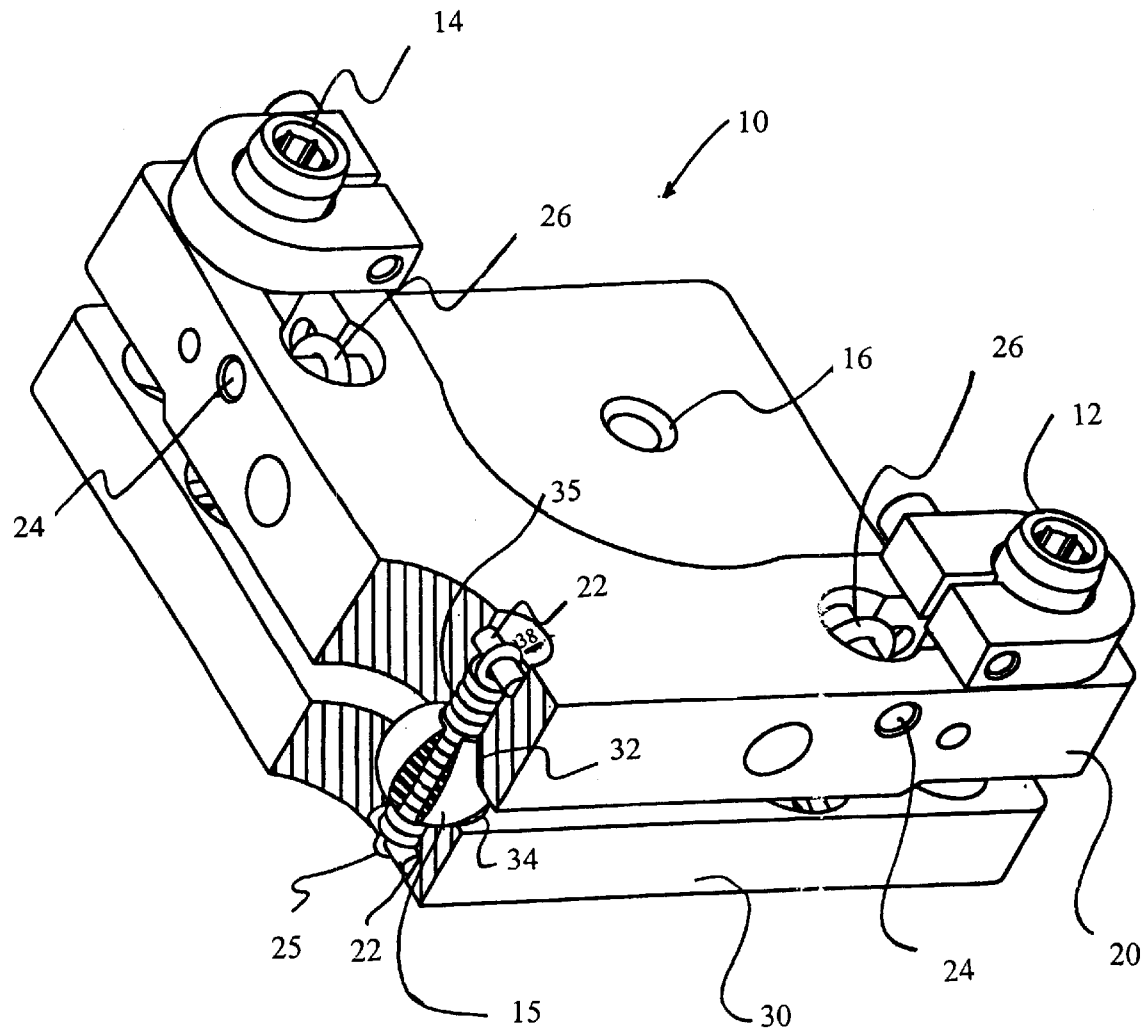
FIG. 2 shows a mounting structure including a spring passing through and substantially bisecting a pivot ball positioned within a recess formed by first and second detents.

Turning now to FIG. 2, a mounting structure 10 of the present invention is shown. As in the prior art, the mounting structure 10 comprises first and second mounting plates 20, 30 adjustably affixed together. In a preferred embodiment, the first mounting plate 20 is at least adjustably fixed to the second mounting plate 30 in facing engagement at a first location. Preferably, the first and second mounting plates 20,30 are adjustably fixed at a second location although, alternatively, the first and second mounting 20, 30 plates may be non-adjustably fixed at a second location.

The first and second mounting plates 20, 30 include first and second detents 32, 34, respectively, which cooperate to form a recess. Disposed within the recess is a pivot ball 15 about which the first and second mounting plates 20, 30 slightly rotate or "rock" during adjustment of the plates 20, 30. The pivot ball 15 is shown in cut-away to show the incorporation of a spring 35 fixed to the first and second mounting plates 20, 30 and passing through and bisecting the pivot ball 15. The first and second mounting plates 20, 30 are also shown in partial cut-away to better illustrate the configuration of the pivot ball 15 and spring 35 assembly.

In a preferred embodiment, the spring 35 is retained within countersunk holes 38 by rods 22 sized to fit within the countersunk holes 38. The rods 22 thus prevent the spring 35 from contracting and maintain the spring 35 within the though hole formed through the pivot ball 15. Of course, alternative means well known in the prior art may be used to maintain the spring 15 in place.

In use, the first mounting plate 20 includes a mounting hole 16 for accommodating a scientific instrument (such as an optical mirror) or some other device that is desired to be adjustably fixed to a stable support structure such as an optical table. Also, the second mounting plate 30 includes a second mounting hole (not shown) for securely fixing the second mounting plate to the underlying stable support structure. Thus, for use with an optical table, a bolt or other fastener may be passed through a countersunk second mounting hole and into the optical table or other support structure and securely tightened to immovably affix the second mounting plate 30 relative to the underlying support structure. Alternatively, the second mounting hole may be threaded and a bolt may be installed from beneath the support structure and tightened to immovably affix the first mounting plate to the support structure.

As shown in FIG. 2, the first and second mounting plates 20, 30 are adjustably affixed together at first and second locations with adjustment screws 12, 14. The adjustment screws are configured such that rotation of the screws 12, 14 causes the corresponding corners of the first and second mounting plates 12, 14 to move either closer or farther apart with respect to each other. As with the configuration of FIG. 1, adjustment of mechanism 12 causes the mounting plate 20 to hinge about an axis defined by the pivot ball 13 and the adjustment mechanism 14. Conversely, adjustment of mechanism 14 causes the mounting plate 20 to hinge about an axis defined by the pivot ball 13 and the adjustment mechanism 12. The adjustment screws 12, 14 are thus tightened or loosened to cause the first mounting plate 20 to rock about the pivot ball 15 and allow three-dimensional adjustment of the planar orientation of the first mounting plate 20 relative to the planar orientation of the second mounting plate 30.

For applications that only require two-dimensional adjustment, i.e., rocking of the mounting plate 20 about a single axis, the first mounting plate may be adjustably fixed to the second mounting plate at only a first location. Although the first mounting plate may be also be fixed at a second location, there is no need for it to be adjustably fixed and it need not be provided with an adjustment mechanism. Also, the first mounting plate may be fixed to the second mounting plate 30 using only an adjustable mechanism 12 at a first location and the pivot ball 15 and spring 35 combination at the second location. Thus, adjustment of the adjustable mechanism 12 causes two-dimensional "rocking" of the first mounting plate 20 about an axis defined by the pivot ball 15 and spring 35 combination.

It should be understood that the ball pivot 15 and spring 35 combination can be used anywhere that three-dimensional or two-dimensional planar adjustability is required. Although the present invention is particularly suitable for application in the field of optics, it is not so limited and can be used in other mechanical applications, including automotive, aircraft, and general mechanical components.

As shown, adjustment mechanisms 12, 14 are hex head bolts, but may be any type of adjustable fastener well known in the art. For some dynamic applications, the adjustment mechanisms may be high-speed mechanisms that allow precise three-dimensional control of the optical instrument mounted thereon. An example of such an application is laser displays or so-called "laser light shows."

By incorporation of the spring 35 through the pivot ball 15, the present invention increases durability and resistance of the mount to jarring and other causes of misalignment. Particularly, shipping often results in significant movement of prior art mounts from their factory settings. This causes the customer to have to reconfigure the misaligned mounts to recover the factory setting before the system incorporating the mounts can be used.

An improved mount structure has been herein shown and described. From the foregoing, it will be appreciated that although preferred embodiments have been described herein for purposes of illustration, various modifications may be made without deviating from the spirit of the invention. Thus, the present invention is not limited to the embodiments described herein, but rather is defined by the claims that follow.

I claim:

1. An adjustable mounting structure comprising:
   a first mounting plate;
   a second mounting plate adjustably fixed to a first mounting plate and in facing engagement with the first mounting plate;
   a pivot ball having a hole formed therethrough, the first and second mounting plates pivotable about the pivot ball; and
   a spring fixed to the first mounting plate at a first end and fixed to the second mounting plate at a second end, the spring passing through the hole formed through the pivot ball.

2. The mounting structure of claim 1 wherein the first mounting plate is adjustably fixed to the second mounting plate at a first location.

3. The mounting structure of claim 2 wherein the first mounting plate is fixed to the second mounting plate at a second location.

4. The mounting structure of claim 2 wherein the first mounting plate is adjustably fixed to the second mounting plate at a second location.

5. The mounting structure of claim 1 wherein the pivot ball is positioned within a recess formed by cooperating first and second detents provided in the first and second mounting plates.

6. The mounting structure of claim 1 wherein the mounting structure is an optical mount, the first mounting plate further including a fixture adapted to receive an optical instrument.

7. A joint for movably securing a first structure to a second structure comprising:

a first structure;

a second structure;

a pivot ball having a hole formed therethrough, the pivot ball positioned between the first structure and the second structure, the first and second structures pivotably movable about the pivot ball; and a spring fixed to the first structure at a first end and fixed to the second structure at a second end, the spring passing through the hole formed through the pivot ball.

8. The mounting structure of claim 7 wherein the first structure is adjustably fixed to the second structure at a first location.

9. The mounting structure of claim 8 wherein the first mounting plate is fixed to the second structure at a second location.

10. The mounting structure of claim 8 wherein the first structure is adjustably fixed to the second structure at a second location.

11. The mounting structure of claim 7 wherein the pivot ball is positioned within a recess formed by cooperating first and second detents provided in the first and second structures.

12. A method of pivotably fixing a first structure to a second structure comprising:

providing a mount comprising a first mounting plate, a second mounting plate, a pivot ball having a hole formed therethrough, and a spring;

positioning the pivot ball between the first mounting plate and the second mounting plate;

affixing the spring to the first mounting plate at a first end; and affixing the spring to the second mounting plate at a second end such that the spring passing through the hole formed through the pivot ball.

13. The method of claim 12, wherein the first mounting plate is adjustably fixed to the second mounting plate with a first adjustment mechanism, the method including the step of adjusting the planar orientation of the first mounting plate relative to the second mounting plate by adjusting the first adjustment mechanism.

14. The method of claim 12, wherein the first mounting plate is adjustably fixed to the second mounting plate with a first adjustment mechanism and a second adjustment mechanism, the method including the step of three-dimensionally adjusting the planar orientation of the first mounting plate relative to the second mounting plate by adjusting the first adjustment mechanism and the second adjustment mechanism.

15. An adjustable mount comprising a first mounting structure, a second mounting structure adjustably fixed to a first mounting and in facing engagement with the first mounting structure, and a pivot ball positioned within a recess formed by cooperating first and second detents provided in the first and second mounting structures, the first and second mounting structures pivotable about the pivot ball; the improvement comprising:

a hole formed through the pivot ball; and a spring fixed to the first mounting structure at a first end and fixed to the second mounting structure at a second end, the spring passing through the hole formed through the pivot ball.

16. The mount of claim 15 wherein the first mounting structure is adjustably fixed to the second mounting structure at a first location.

17. The mount of claim 16 wherein the first mounting structure is fixed to the second mounting structure at a second location.

18. The mount of claim 16 wherein the first mounting structure is adjustably fixed to the second mounting structure at a second location.

19. The mount of claim 15 wherein the mount is an optical mount, the first mounting structure further including a fixture adapted to receive an optical instrument.

* * * * *